(12) United States Patent
Suzuki

(10) Patent No.: US 8,054,477 B2
(45) Date of Patent: Nov. 8, 2011

(54) IMAGE READING APPARATUS AND CONTROL METHOD FOR IMAGE FORMING APPARATUS FOR REDUCING OPERATOR WAIT TIME

(75) Inventor: Tatsuhisa Suzuki, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1227 days.

(21) Appl. No.: 11/212,618

(22) Filed: Aug. 29, 2005

(65) Prior Publication Data
US 2006/0215182 A1 Sep. 28, 2006

(30) Foreign Application Priority Data
Mar. 24, 2005 (JP) ................................. 2005-086622

(51) Int. Cl.
*G06K 15/00* (2006.01)
*G06F 3/12* (2006.01)
(52) U.S. Cl. ...................... 358/1.13; 358/1.14; 358/1.15
(58) Field of Classification Search .................. None
See application file for complete search history.

(56) References Cited

U.S. PATENT DOCUMENTS

| | | | | |
|---|---|---|---|---|
| 5,828,462 A * | 10/1998 | Hashimoto et al. | ........... | 358/296 |
| 5,915,148 A * | 6/1999 | Hamaguchi et al. | ........... | 399/77 |
| 6,612,758 B2 * | 9/2003 | Yokoyama | ...................... | 400/70 |
| 2003/0098990 A1 * | 5/2003 | Nakamura | .................... | 358/1.14 |
| 2003/0191975 A1 * | 10/2003 | Kohara | ........................ | 713/300 |

FOREIGN PATENT DOCUMENTS

| | | |
|---|---|---|
| JP | 11-334180 A | 12/1999 |
| JP | A 2000-94794 | 4/2000 |
| JP | A-2001-100968 | 4/2001 |
| JP | 2001-236146 A | 8/2001 |
| JP | A-2002-009992 | 1/2002 |
| JP | A-2002-314736 | 10/2002 |
| JP | A-2004-064421 | 2/2004 |
| JP | A-2004-259223 | 9/2004 |

OTHER PUBLICATIONS

Dec. 15, 2009 Japanese Office Action issued in JP-A-2005-086622 (with translation).
Office Action issued in JP Application No. 2005-086622 on Jan. 11, 2011 (with English translation).

* cited by examiner

*Primary Examiner* — King Poon
*Assistant Examiner* — Ming Hon
(74) *Attorney, Agent, or Firm* — Oliff & Berridge, PLC

(57) ABSTRACT

An image reading apparatus that is connectable with one or more image forming apparatuses and able to configure a copy system together with the image forming apparatuses connected thereto, comprises an instruction receiving unit that receives an instruction to shift to a copy mode; and an instruction transmitting unit that transmits a releasing instruction to release a power saving state to at least one of the image forming apparatuses, when the instruction receiving unit receives the instruction to shift to the copy mode.

10 Claims, 4 Drawing Sheets

IMAGE READING APPARATUS AND CONTROL METHOD FOR IMAGE FORMING APPARATUS FOR REDUCING OPERATOR WAIT TIME

BACKGROUND OF THE INVENTION

1. Field of the Invention

The present invention relates to an image reading apparatus and a control method for an image forming apparatus, and particularly relates to an image reading apparatus which is able to configure a copy system together with an image forming apparatus connected thereto, and a method of controlling an image forming apparatus from the image reading apparatus connected thereto.

2. Description of the Related Arts

In recent years, there have been provided a variety of image reading apparatuses such as scanners and image forming apparatuses such as printers, spanning from expensive and sophisticated apparatuses to inexpensive and non-sophisticated apparatuses.

Accordingly, in addition to a typical way of connecting these the image reading apparatus and image forming apparatus to an information processing apparatus such as a personal computer, there has been an increased number of cases in which an image reading apparatus is directly connected to an image forming apparatus to use them as a copy system.

Referring to a flowchart in FIG. 5 illustrating the operation of a conventional image reading apparatus, the conventional image reading apparatus operated as a part of a copy system will now be described.

Upon receiving from a user a mode shift instruction to shift to the copy mode (YES in step 501), the image reading apparatus presents a list of image forming apparatuses which are selectable as an output destination, from among the image forming apparatuses connected to the image reading apparatus (step 502).

Upon one of the image forming apparatuses being selected as the output destination by the user (YES in step 503), the image reading apparatus transmits, to the selected image forming apparatus, a return instruction to instruct the same to return from the power saving state (step 504).

Upon receiving from the user an instruction to execute copying (YES in step 505), the image reading apparatus reads an original document to generate image data (step 506), and transmits the generated image data to the selected image forming apparatus (step 507) to complete the processing.

Therefore, in such conventional copy system, in general, an image forming apparatus has to be designated first, and then the image reading apparatus releases the power saving state of the designated image forming apparatus.

An example of techniques to control the power saving state of the image forming apparatus is described in Japanese Patent Application Publication No. 2000-94794.

However, in the conventional copy system, as described above, an image forming apparatus has to be designated as an output destination by a user before releasing the power saving state of the image forming apparatus. Therefore, even after giving an instruction to perform copying, the user is unable to obtain output until the image forming apparatus becomes ready to operate. Such copy system cannot be considered user-friendly.

SUMMARY OF THE INVENTION

The present invention has been made in view of the circumstances and provides an image reading apparatus and a control method for an image forming apparatus, capable of configuring a copy system which allows the user to obtain output from an image forming apparatus without waiting after giving instructions to perform copy processing.

According to an aspect of the present invention, an image reading apparatus that is connectable with one or more image forming apparatuses and able to configure a copy system together with the image forming apparatuses connected thereto, comprises an instruction receiving unit that receives an instruction to shift to a copy mode; and an instruction transmitting unit that transmits a releasing instruction to release a power saving state to at least one of the image forming apparatuses, when the instruction receiving unit receives the instruction to shift to the copy mode.

With the above configuration, a copy system can be configured to allow the user to obtain output from the image forming apparatus without waiting after giving instruction to perform copy processing.

BRIEF DESCRIPTION OF THE DRAWINGS

Embodiments of the present invention will be described in detail based on the following figures, wherein.

DESCRIPTION OF THE PREFERRED EMBODIMENTS

Description will now be made of a control method for an image reading apparatus and image forming apparatus according to embodiments of the present invention with reference to attached drawings.

Embodiment 1

Figure 1:
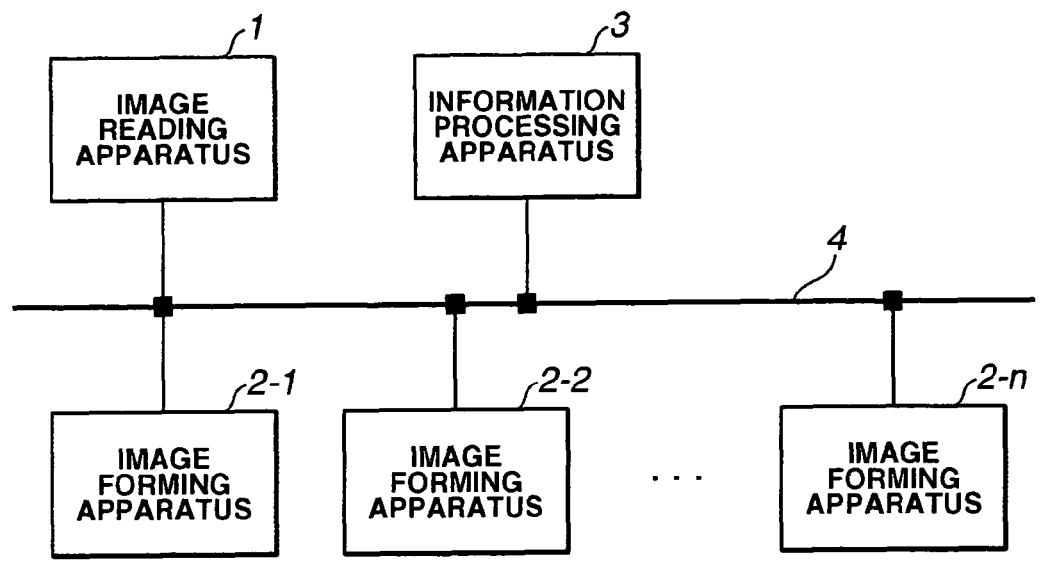
FIG. 1 is a block diagram illustrating an example of configuration of a copy system employing an image reading apparatus to which the present invention is applied.

FIG. 1 is a block diagram illustrating an example of configuration of a copy system employing an image reading apparatus according to an embodiment of the present invention. The copy system as shown in FIG. 1 is formed by connecting an image reading apparatus 1 to plural image forming apparatuses 2 (2-1 to 2-*n*) and an information processing apparatus 3 by means of a network 4.

The image reading apparatus 1, to which the present invention is applied, reads an original document to generate image data, and transmits the generated image data to the image forming apparatuses 2 and the information processing apparatus 3. Each of the image forming apparatuses 2 forms an image on paper based on the image data received from the image reading apparatus 1 and the information processing apparatus 3. The information processing apparatus 3 is a personal computer which executes various processing operations including image processing.

The information processing apparatus 3 is not always necessary for the copy system. The number of the image reading apparatuses 1 and the number of the image forming apparatuses 2 are not limited to any particular number. Further, the image reading apparatus 1 and the image forming apparatuses 2 need not necessarily be connected by the network 4, but may be locally connected.

Figure 2:
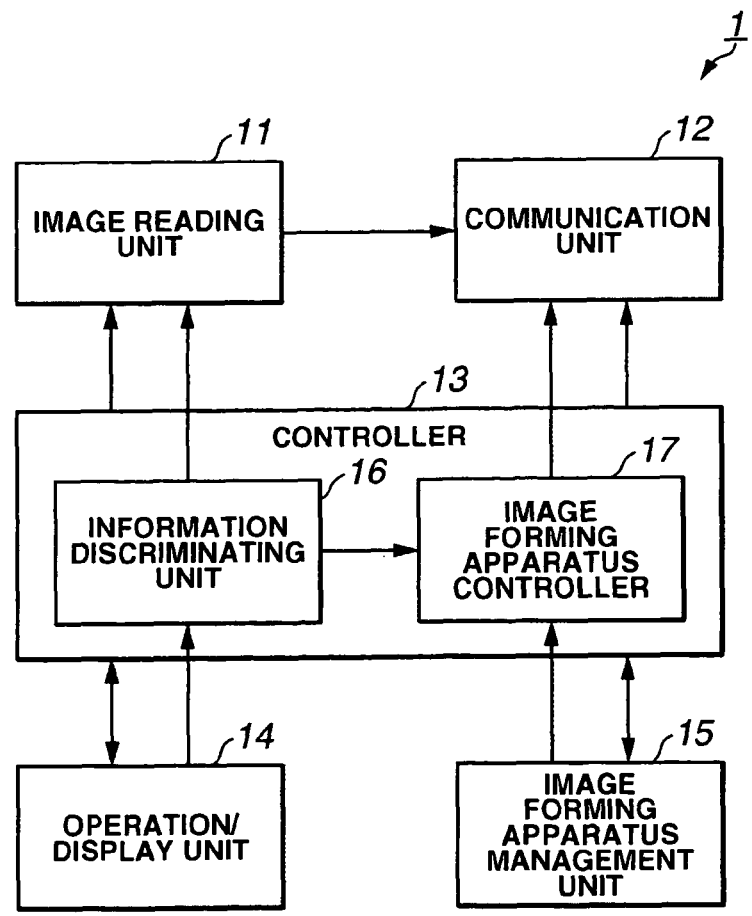
FIG. 2 is a block diagram illustrating functional configuration of the image reading apparatus 1 in FIG. 1 according to an embodiment of the present invention.

Configuration of the image reading apparatus 1 will now be described. FIG. 2 is a block diagram illustrating functional configuration of the image reading apparatus 1.

As shown in FIG. 2, the image reading apparatus 1 includes an image reading unit 11, a communication unit 12, a controller 13, an operation/display unit 14, and an image forming apparatus management unit 15. The controller 13 has an information discriminating unit 16 and an image forming apparatus controller 17.

The image reading unit 11 is for reading an original document to generate image data, and is formed by an image pickup element such as a CCD (Charge Coupled Device).

The communication unit 12 is for communicating with the image forming apparatus 1, and has an interface compatible with the network 4.

The controller 13 is for controlling the image reading apparatus 1 as a whole, and is provided by operating a processor by software or is formed by an exclusive IC.

The operation/display unit 14 is for providing a user interface for users, and is formed by a display device, an operation key, and the like.

The image forming apparatus management unit 15 is for managing information such as addresses of the image forming apparatuses 2 which constitute possible output destinations when the image reading apparatus 1 operates in the copy mode, and is formed by a storage device such as a memory. The image forming apparatus management unit 15 may be arranged to manage all the image forming apparatuses 2 that can be used as output destinations, or a part of the usable image forming apparatuses 2 which are divided into groups.

The information discriminating unit 16, operating as a part of the controller 13, discriminates instructions received from the operation/display unit 14 to control the image reading unit 11. Additionally, upon instructed to shift to the copy mode, the information discriminating unit 16 also notifies the image forming apparatus controller 17 of that instruction.

The image forming apparatus controller 17 operates as a part of the controller 13. When the information discriminating unit 16 has received the instruction to shift to the copy mode, the image forming apparatus controller 17 transmits a return instruction to the image forming apparatuses 2 of which information is managed by the image forming apparatus management unit 15 via the communication unit 12, to instruct the image forming apparatuses 2 to return from the power saving state.

Figure 3:
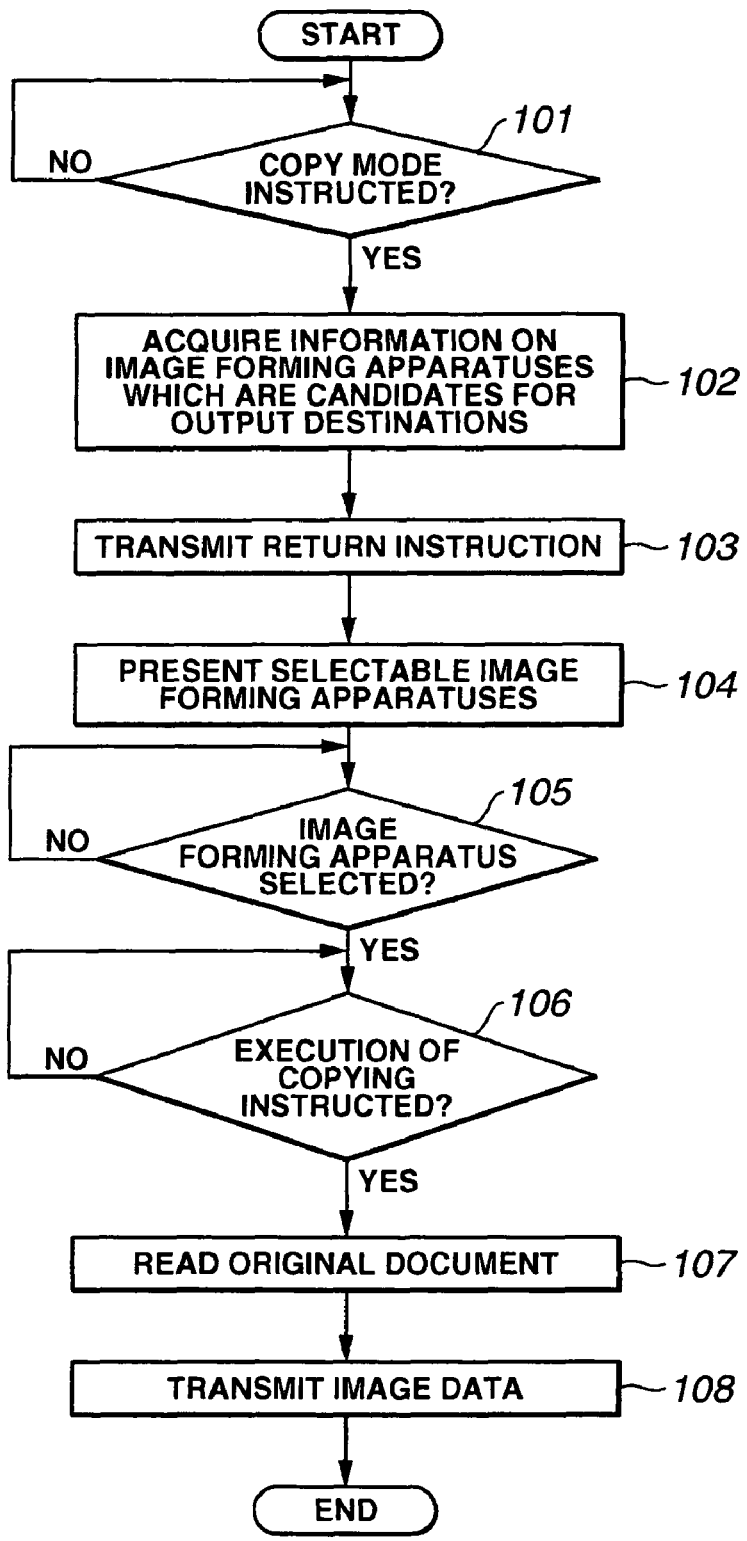
FIG. 3 is a flowchart illustrating the flow of operation of the image reading apparatus 1.

Next, operation of the image reading apparatus 1 will be described. FIG. 3 is a flowchart illustrating the flow of operation of the image reading apparatus 1.

When the user operates the operation/display unit 14 to instruct the image reading apparatus 1 to shift to the copy mode and the information discriminating unit 16 has received the instruction (YES in step 101), the image forming apparatus controller 17 acquires, from the image forming apparatus management unit 15, information managed by the image forming apparatus management unit 15, that is, information of the image forming apparatuses 2 which can be used as an output destination (step 102). The image forming apparatus controller 17 then transmits an instruction to the corresponding image forming apparatuses 2 to instruct them to return from the power saving state (step 103).

Subsequently, the controller 13 presents a list of the image forming apparatuses selectable as an output destination on the operation/display unit 14 (step 104). When the user selects one of the image forming apparatuses 2 as the output destination (YES in step 105) and an instruction to execute copying is received from the user (YES in step 106), the controller 13 operates the image reading unit 11 to read an original document and to generate image data (step 107). The communication unit 12 then transmits the generated image data to the selected image forming apparatus (step 108), and the processing terminates.

Thus, the image reading apparatus 1 releases the power saving state of the image forming apparatuses 2 which can be used as an output destination, upon receiving from the user an instruction to shift to the copy mode. This allows the user to obtain output from the selected image forming apparatus 2 without waiting for the image forming apparatus 2 returning from the power saving state after giving an instruction to execute copy processing.

Embodiment 2

A second embodiment of the present invention will now be described in terms of a case in which the image reading apparatus 1 performs, in addition to the processing described in the first embodiment, control processing to cause the image forming apparatuses 2 to the power saving state.

According to the second embodiment, the image reading apparatus 1 additionally performs processing to notify the image forming apparatus controller 17 that the information discriminating unit 16 has received an instruction to shift to the scan mode, and processing to transmit a power saving instruction from the image forming apparatus controller 17 to the image forming apparatuses 2 to instruct them to shift to the power saving state.

Figure 4:
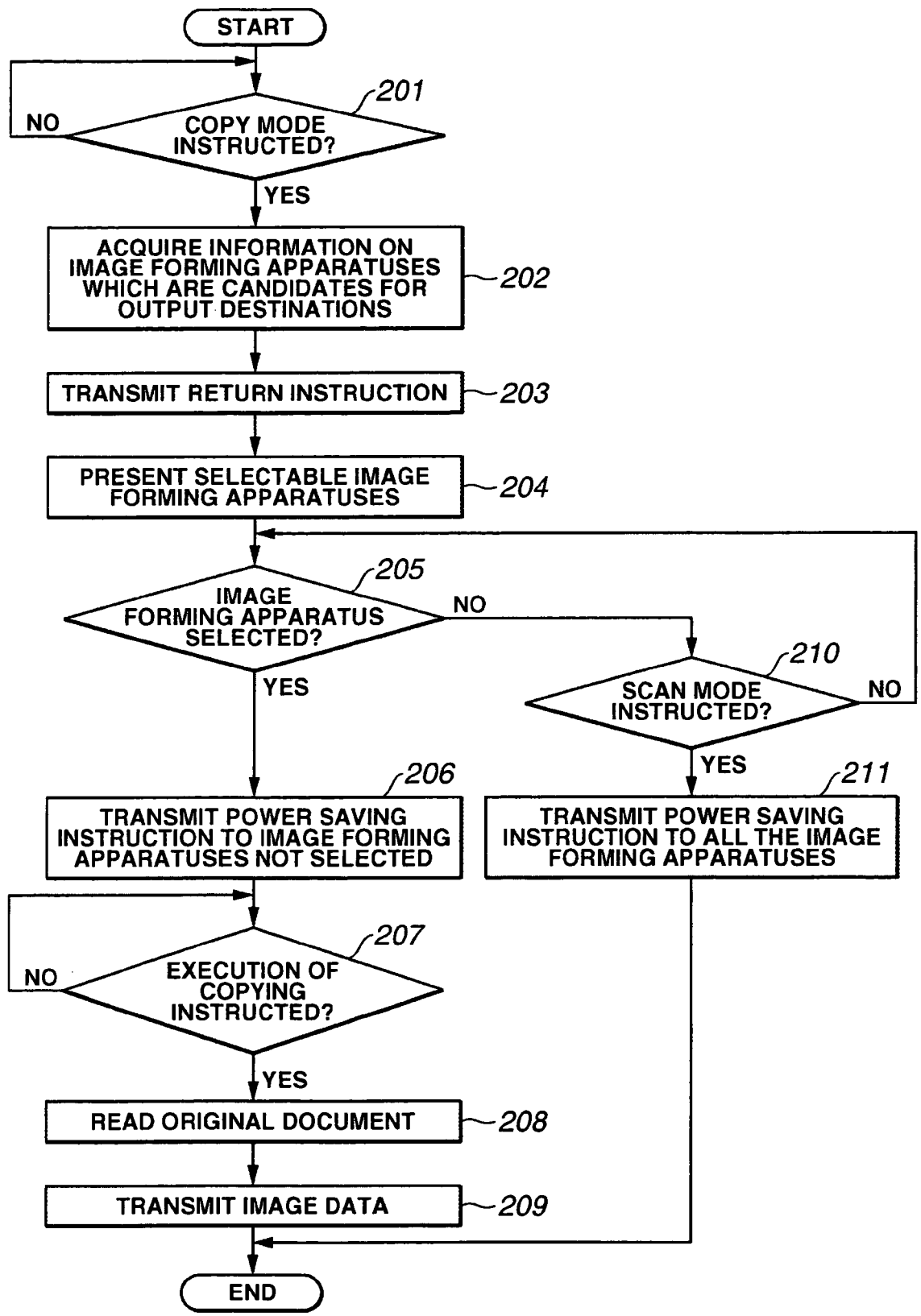
FIG. 4 is a flowchart illustrating the flow of operation of an image reading apparatus 1 according to another embodiment.
Figure 5:
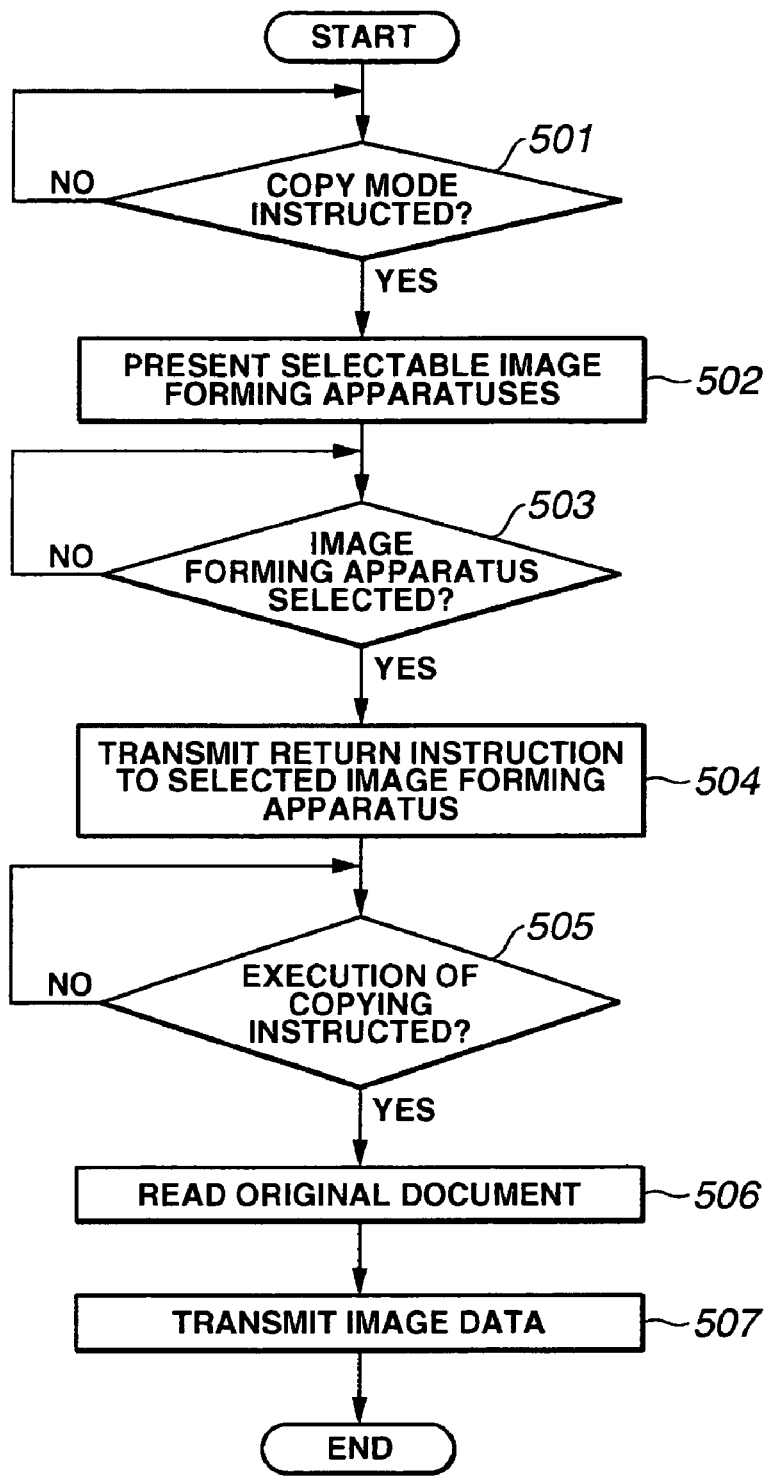
FIG. 5 is a flowchart illustrating the flow of operation of a conventional image reading apparatus.

Description will now be made of operation of the image reading apparatus 1 according to the second embodiment. FIG. 4 is a flowchart illustrating the flow of operations of the image reading apparatus 1 according to the second embodiment.

When the user operates the operation/display unit 14 to instruct the image reading apparatus 1 to shift to the copy mode, and the information discriminating unit 16 receives this instruction (YES in step 201), the image forming apparatus controller 17 acquires, from the image forming apparatus management unit 15, information managed by the image forming apparatus management unit 15, that is, information on the image forming apparatuses 2 which can be used as output destinations (step 202). The image forming apparatus controller 17 then transmits, to the corresponding image forming apparatuses 2, a return instruction to instruct the image forming apparatuses 2 to return from the power saving state (step 203).

Subsequently, the controller 13 presents a list of the image forming apparatuses selectable as an output destination on the operation/display unit 14 (step 204). When the user selects one of the image forming apparatuses 2 as the output destination (YES in step 205), the image forming apparatus controller 17 transmits, via the communication unit 12, a power saving instruction to the image forming apparatuses 2 which are not selected by the user to instruct them to shift to the power saving state (step 206). Thereafter, upon receiving an instruction from the user to perform copying (YES in step 207), the controller 13 operates the image reading unit 11 to read an original document and to generate image data (step 208). The communication unit 12 then transmits the generated image data to the selected image forming apparatus (step 209), and the processing terminates.

If the user selects the scan mode to transmit image data to the information processing apparatus 3 in the condition where the image reading apparatus 1 has shifted to the copy mode (NO in step 205, and YES in step 210), the information discriminating unit 16, which has received the instruction to shift to the scan mode, notifies the image forming apparatus controller 17 accordingly. The image forming apparatus controller 17 then transmits, via the communication unit 12, a power saving instruction to all the image forming apparatuses 2 which have previously been instructed to return from the power saving state, to instruct them to shift to the power saving state (step 211). Thus, the processing terminates.

The image reading apparatus 1 according to the second embodiment as described above, releases the power saving state of the image forming apparatuses 2 which can be used as output destinations, at the time when receiving from the user an instruction to shift to the copy mode. Therefore, the user is allowed to obtain output without waiting for the image forming apparatuses 2 returning from the power saving state, after giving instruction to execute copying. Further, the unnecessary power consumption can be minimized by resetting the unnecessary image forming apparatuses 2 to the power saving state.

As described above, according to an aspect of the present invention, an image reading apparatus that is connectable with one or more image forming apparatuses and able to configure a copy system together with the image forming apparatuses connected thereto, comprises an instruction receiving unit that receives an instruction to shift to a copy mode; and an instruction transmitting unit that transmits a releasing instruction to release a power saving state to at least one of the image forming apparatuses, when the instruction receiving unit receives the instruction to shift to the copy mode.

According to another aspect of the present invention, the image reading apparatus further comprises an information management unit that manages information on an image forming apparatus that is designated for use in the copy mode, of the image forming apparatuses connected to the image reading apparatus, wherein the instruction transmitting unit transmits the releasing instruction to the image forming apparatus associated with the information managed by the information management unit.

According to still another aspect of the present invention, the image reading apparatus further comprises a selecting unit that selects an image forming apparatus to be used in the copy mode, when the instruction transmitting unit transmits the releasing instruction to a plurality of the image forming apparatuses of the image forming apparatuses connected to the image reading apparatus, wherein the instruction transmitting unit transmits a power saving instruction to an image forming apparatus that has not been selected by the selecting unit, to instruct the unselected image forming apparatus to shift to the power saving state.

According to even another aspect of the present invention, the instruction receiving unit receives the instruction to shift to a scan mode; and the instruction transmitting unit transmits a power saving instruction to the image forming apparatus to which the releasing instruction has been transmitted, to instruct to shift to the power saving state when the instruction receiving unit receives the instruction to shift to the scan mode.

According to yet another aspect of the present invention, a control method for image forming apparatus, the control method being executed by an image reading apparatus that is connectable with one or more image forming apparatuses and able to configure a copy system together with the image forming apparatuses connected thereto, comprises transmitting, by an instruction transmitting unit, a releasing instruction to release a power saving state to at least one of the image forming apparatuses when an instruction receiving unit receives an instruction to shift to a copy mode.

According to further aspect of the present invention, in the control method for image forming apparatus, the instruction transmitting unit transmits the releasing instruction to image forming apparatuses that are designated for use in the copy mode and managed by an information management unit.

According to still further aspect of the present invention, in the control method for image forming apparatus, the instruction transmitting unit transmits a power saving instruction to an image forming apparatus that is not selected by a selecting unit as an image forming apparatus to be used in the copy mode, of the image forming apparatuses to which the releasing instruction has been transmitted, to instruct the unselected image forming apparatus to shift to the power saving state.

According to further aspect of the present invention, in the control method for image forming apparatus, the instruction transmitting unit transmits a power saving instruction to the image forming apparatus to which the releasing instruction has been transmitted, to instruct to shift to the power saving state when the instruction receiving unit receives the instruction to shift to the scan mode.

The forgoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-86622 filed on Mar. 24, 2005 including specification, claims, drawings and abstract is incorporated herein by reference in its entirety.

What is claimed is:

1. An image reading apparatus that is connectable with more than one image forming apparatuses and able to configure a copy system together with the image forming apparatuses connected thereto; the image reading apparatus comprising:

an image reading unit that reads an original document to generate image data, an acquiring unit that acquires information about the image forming apparatuses;

an instruction receiving unit that receives an instruction to shift to a copy mode or to a scan mode;

an instruction transmitting unit that transmits a releasing instruction to release a power saving state to each of a plurality of selectable image forming apparatuses based on the acquired information, when the instruction receiving unit receives the instruction to shift to the copy mode wherein the plurality of selectable image forming apparatuses include all currently inactive printers having sufficient physical capabilities to support the generated image data; and a selecting unit that selects an image forming apparatus to be used in the copy mode, to which the image data generated by the image reading unit is to be transmitted, after the releasing instruction has been transmitted, wherein the instruction transmitting unit transmits a power saving instruction to each of the image forming apparatuses other than the selected image forming apparatus from among the image forming apparatuses to which the releasing instruction to release the power saving state has been transmitted by the instruction transmitting unit, to cause the image forming apparatuses to shift to the power saving state, the power saving instruction being transmitted at the time the selected image forming apparatus is selected, and when the instructing receiving unit receives the instruction to shift from the copy mode to the scan mode, the instruction transmitting unit transmits the power saving instruction to the image forming apparatus to which the releasing instruction has been transmitted during the copy mode, to instruct to shift to the power saving state.

2. The image reading apparatus according to claim 1, further comprising an information management unit that manages information on an image forming apparatus that is designated for use in the copy mode, of the image forming apparatuses connected to the image reading apparatus,
wherein the instruction transmitting unit transmits the releasing instruction to the image forming apparatus associated with the information managed by the information management unit.

3. The image reading apparatus according to claim 1, wherein the selectable image forming apparatuses include less than all of the image forming apparatuses.

4. The image reading apparatus according to claim 1, wherein an address of each of the image forming apparatuses to which the releasing instruction has been transmitted is stored by a storage device.

5. The image reading apparatus according to claim 1, wherein the selecting unit selects after a listing of the selectable image forming apparatuses has been generated.

6. A control method for image forming apparatus, the control method being executed by an image reading apparatus that is connectable with more than one image forming apparatuses and able to configure a copy system together with the image forming apparatuses connected thereto, comprising:
acquiring, by an acquiring unit, information about the image forming apparatuses;
transmitting, by an instruction transmitting unit, a releasing instruction to release a power saving state to each of a plurality of selectable image forming apparatuses, based on the acquired information, when an instruction receiving unit receives an instruction to shift to a copy mode;
wherein the plurality of selectable image forming apparatuses include all currently inactive printers having sufficient physical capabilities to support the generated image data; and
selecting, by a selecting unit, an image forming apparatus to be used in the copy mode, to which the image data generated by the image reading unit is to be transmitted, after the releasing instruction has been transmitted,
wherein the instruction transmitting unit transmits a power saving instruction to each of the image forming apparatuses other than the selected image forming apparatus from among the image forming apparatuses to which the releasing instruction to release the power saving state has been transmitted by the instruction transmitting unit, to cause the image forming apparatuses to shift to the power saving state, the power saving instruction being transmitted at the time the selected image forming apparatus is selected, and when the instruction receiving unit receives the instruction to shift from the copy mode to a scan mode, the instruction transmitting unit transmits the power saving instruction to the image forming apparatus to which the releasing instruction has been transmitted during the copy mode, to instruct to shift to the power saving state.

7. The control method for image forming apparatus according to claim 6, wherein the instruction transmitting unit transmits the releasing instruction to image forming apparatuses that are designated for use in the copy mode and managed by an information management unit.

8. The control method for image forming apparatus according to claim 6, wherein the selectable image forming apparatuses include less than all of the image forming apparatuses.

9. The control method for image forming apparatus according to claim 6, wherein an address of each of the image forming apparatuses to which the releasing instruction has been transmitted is stored by a storage device.

10. The control method for imaging forming apparatus according to claim 6, further comprising:
selecting, by the selecting unit, the image forming apparatus to be used in the copy mode after generating a listing of the selectable image forming apparatuses.

* * * * *